US007858066B2

(12) United States Patent
Torardi

(10) Patent No.: US 7,858,066 B2
(45) Date of Patent: Dec. 28, 2010

(54) METHOD OF MAKING TITANIUM DIOXIDE PARTICLES

(75) Inventor: Carmine Torardi, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 133 days.

(21) Appl. No.: 11/800,958

(22) Filed: May 8, 2007

(65) Prior Publication Data

US 2008/0279760 A1 Nov. 13, 2008

(51) Int. Cl.
  *C01G 23/047* (2006.01)
  *C01G 23/053* (2006.01)
  *C01G 23/08* (2006.01)
(52) U.S. Cl. .................. 423/610; 423/598; 423/611; 423/612; 423/69; 23/300
(58) Field of Classification Search .............. 423/598, 423/610–612, 69; 23/300
  See application file for complete search history.

(56) References Cited

U.S. PATENT DOCUMENTS

| | | | |
|---|---|---|---|
| 3,518,053 A | 6/1970 | Kolznak et al. | |
| 3,676,362 A | 7/1972 | Yates | |
| 3,898,321 A | 8/1975 | Marsh | |
| 4,218,430 A | 8/1980 | Biggerstaff | |
| 4,286,378 A | 9/1981 | Micheli | |
| 4,944,936 A | 7/1990 | Lawhorne | |
| 5,021,392 A | 6/1991 | Daly et al. | |
| 5,156,828 A | 10/1992 | Degnan et al. | |
| 5,718,878 A | 2/1998 | Zhang | |
| 5,840,111 A | 11/1998 | Wiederhoft et al. | |
| 6,168,830 B1 | 1/2001 | Nae-Lih et al. | |
| 6,375,923 B1 | 4/2002 | Duyvesteyn et al. | |
| 6,440,383 B1 | 8/2002 | Duyvesteyn et al. | |
| 6,444,189 B1 | 9/2002 | Wang et al. | |
| 6,517,804 B1* | 2/2003 | Kim et al. | 423/610 |
| 6,548,039 B1 | 4/2003 | Duyvesteyn et al. | |
| 7,223,377 B2 | 5/2007 | Domen et al. | |
| 2003/0166765 A1 | 9/2003 | Sugihara | |
| 2005/0232851 A1 | 10/2005 | Prochazka et al. | |
| 2006/0110314 A1 | 5/2006 | Torardi | |
| 2006/0110315 A1 | 5/2006 | Torardi | |
| 2006/0110316 A1 | 5/2006 | Torardi | |
| 2006/0110317 A1 | 5/2006 | Torardi | |
| 2006/0110318 A1 | 5/2006 | Torardi | |
| 2006/0257312 A1 | 11/2006 | Torardi | |
| 2006/0263291 A1 | 11/2006 | Torardi | |
| 2008/0031806 A1 | 2/2008 | Gavenonis et al. | |

FOREIGN PATENT DOCUMENTS

| | | |
|---|---|---|
| CN | 1097400 A | 1/1995 |
| CN | 1310208 | 8/2001 |
| EP | 0275688 | 7/1988 |
| EP | 0774443 | 11/1996 |
| EP | 1422198 | 5/2004 |
| FR | 1597102 A | 7/1970 |
| JP | 01133939 | 5/1989 |
| JP | 07002523 | 9/1991 |
| JP | 4089318 | 3/1992 |
| JP | 05139703 | 6/1993 |
| JP | 200070727 | 3/2000 |
| JP | 2001031422 | 2/2001 |
| JP | 2001130912 | 5/2001 |
| JP | 2001246247 | 9/2001 |
| JP | 2002060220 | 2/2002 |
| JP | 2002067420 | 3/2002 |
| JP | 02086823 | 3/2007 |
| NL | 136392 | 2/1973 |
| RU | 1806224 A3 | 3/1993 |
| RU | 2043302 | 9/1995 |
| SU | 247930 | 4/1973 |
| SU | 247930 * | 7/1973 |
| SU | 1806224 | 7/1991 |
| WO | WO0117901 | 3/2001 |
| WO | WO01/81244 | 11/2001 |
| WO | WO03/082742 | 10/2003 |
| WO | WO2006/058254 | 6/2006 |

OTHER PUBLICATIONS

EPO Search Report, Aug. 19, 2008.
H. Kominami et al, Synthesis of Thermally Stable Nanocrystalline Anatase by High-Temperature Hydrolysis of Titanium Alkoxide With Water Dissolved in Organic Solvent From Gas Phase, Journal of Materials Science Letters (1996), 15 (3), 197-200.
I.A. Montoya et al, On The Effects of the SOL-GEL Sysnthesis Parameters on Textural and Structural Characteristics of TIO2, Catalysis Letters (1992), 15 (1-2), 207-217.
Jehane Ragai et al., Origin of Porosity in Titania Gels. I. Microporous and Mesoporous Gels Prepared From Titanous Chloride and Ammonia, J. Chem. Tech. Biotechnol. 1980, 30, 1-6.
Cheng Wang et al., Synthesis of Nanocrystalline TIO2 in Alcohols, Powder Technology 125 (2002) 39-44.
Presentation on May 23, 2005 at The American Chemical Society Mid-Atlantic Regional Meeting, Rutgers University, NJ Charlie Torardi et al, "High Porosity TIO2 VIA Inorganic-Salt Porogens".
G. Wang et al. Titania From Nanoclusters to Nanowires and Nanoforks European Physical Journal D: Stomic, Molecular and Optical Physics (2003), 24 (1-3) 355-360.

(Continued)

*Primary Examiner*—Timothy C Vanoy
*Assistant Examiner*—Diana J Liao

(57) ABSTRACT

The disclosure provides a process for preparing nanocrystalline titanium dioxide, in particular rutile nanocrystalline titanium dioxide, comprising: (a) precipitating a mixture comprising hydrated titanium oxide and a separable filtering agent; (b) filtering the precipitated mixture to form a filter cake comprising the precipitated hydrated titanium dioxide and a separable filtering agent, (c) calcining the precipitated hydrated titanium oxide and separable filtering agent at a temperature of greater than about 300° C.; and (d) removing the separable filtering agent thereby recovering titanium dioxide particles.

9 Claims, No Drawings

OTHER PUBLICATIONS

Frindell et al, Visible and Near-IR Luminescence Via Energy Transfer in Rare Earth Doped Mesoporous Titania Thin Films With Nanocrystalline Walls, Journal of Solid State Chemistry, 172, (2003) pp. 81-88.

Ryoji Takahashi et al, "Structural Study of Mesoporous Titania and Titanium-Stearic Acid Complex Prepared From Titanium Alkoxide" Journal of the Chemical Society, Faraday Transactions, Royal Society of Chemistry Cambridge, GB, vol. 94, No. 20, Oct. 21, 1998, XP000787675.

Cabrera S et al., "Enhanced Surface Area in Thermally Stable Pure Mesoporous TI02" Solid State Sciences, Elsevier, Paris, FR, vol. 2, No. 5, 2000, pp. 513-518, XP001038378.

Kaneko E Y et al., "Characterization of the Porosity Developed in a New Titania-Alumina Catalyst Support Prepared by the Sol Gel Route" Journal of Applied Crystallography, Copenhagen, DK, vol. 36, 2002, pp. 469-472, XP008086390.

Kartini et al, "A Two-Step Sol-Gel Method for Synthesis of Nanoporous TI02" Journal of Nanoscience and Nanotechnology, American Scientific Publishers, US. vol. 4, No. 3, Mar. 2004, pp. 270-274, XP008086389.

Inoue et al., Crystallisation of Titania in Liquid Media At High Temperatures British Ceramic Transactions, vol. 97 (5) 222-226, 1998.

Chang-Wen Guo et al., Fabrication of High Surface Area Fibrous TIO2 With Well-Defined Mesostructures Via a Nonsurfactant Approach, The Chemical Society of Japan, 2002, 588-589.

Hiroshi Hirashima et al., Preparation of Meso-Porous TIO2 Gels and Their Characterization, Elsevier Scienc B.V., Journal of Non-Crystalline Solids 285 (2001) 96-100.

Miah Muhammed Yusuf et al, Preparation of Mesoporous TIO2 Thin Films by Surfactant Templating, Elsevier Science B.V., Journal of Non-Crystalline Solids, 285, (2001), 90-95.

Ki Chang Song et al., Control of Phase and Pore Structure of Titania Powders Using HCl and NH4OH Catalysts, Journal of the American Ceramic Society (2001), 84(1), 92-98.

E. J. Kim et al., Microstructure and Photoactivity of Titania Nanoparticles Prepared in Nonionic W/O Microemulsions, Materials Science and Engineering A 202 (2001) 24-29.

Ki Chang Song et al., The Effect of Alcohol Solvents on the Porosity and Phase Composition of Titania, Journal of Colloid and Interface Science (2002), 231 (2), 289-298.

Olaf Muth et al, On the Way to New Nanoporous Transition Metal Oxides, Studies in Surface Science and Catalysis (2000), 129, 357-366.

Jingzhe Zhao et al, The Preparation and Mechanism Studies of Porous Titania, Materials Chemistry and Physics 63 (2000) 9-12.

E. Sasaoka, et al, Novel Preparation Method of Macroporous Metal Oxides, Journal of Materials Science Letters (1999), 18(7), 551-552.

David M. Antonelli, et al., Synthesis of Hexagonally Packed Mesoporous TIO2 by a Modified Sol-Gel Method, Angew Chem Int. ED Engl. 1995, 34, No. 18.

Ouan, Xuejun; Li, Dacheng; Institute of Ultrafine Powders, Dept. of Inorganic Materials, Sichuan Uni., Chengdu, 610065, Peop Rep. China Effects of Ammonium Chloride on Preparation of High-Urity Ultrafine TIO2 Powder.

Xu, Ying; Chen, Youzhi; Li, Zhihua; Gong. Jun School of Natural Science, Wuhan University of Technology, Wuhan, 430070, Peop. Rep. China "Study of Influence Factors for Dispersed Property of Powder on Preparing Process of TIO2 Nanometer Powder by Precipitation Method".

L.K. Campbell, B.K. NA, and E.I.KO Chem. Mater. 4 (1992) 1329 Synthesis and Characterization of Titania Aerogels.

C.J. Barbe, et al., J. Amer. Ceram. Soc. 80 (1997) 3157 Nanocrystallin Titanium Oxide Electrodes for Photovoltaic Applications.

L. Kavan, et al, J. Phys.Chem. 8 104 (2000) 12012 Surfactant-Templated TIO2 (Anatas): Characteristic Features of Lithium Insection Electrochemistry in Organized Nanostructures.

Peidong Yang et al., Chem. Mater. 11 (1999) 2813 Block Copolymer Templating Syntheses of Mesoporous Metal Oxides With Large Ordering Lengths and Semicrystallin Framework.

Eui Jung Kim et al., "Effect of Calcination on the Microstructures of Tttania Nanoparticles Prepared in 2/D Microemulsions" Journal of Materials Science, Springer/Business Media, Dordrecht, NL, vol. 37, No. 7, Apr. 1, 2002, pp. 1455-1460, XP001001475.

* cited by examiner

METHOD OF MAKING TITANIUM DIOXIDE PARTICLES

FIELD OF THE DISCLOSURE

This disclosure relates to the preparation of nanocrystalline titanium dioxide, and in particular to the preparation of nanocrystalline titanium dioxide using a separable filtering agent.

BACKGROUND OF THE DISCLOSURE

Titanium dioxide, $TiO_2$, is often prepared by starting with an aqueous solution of titanium tetrachloride, commonly referred to as titanium oxychloride, and adding a base, such as NaOH or $NH_4OH$, to produce an amorphous or poorly crystalline hydrated titanium oxy-hydroxide precipitate, often called "titanyl hydroxide" or "titanium hydrolysate", and also form a salt, such as NaCl or $NH_4Cl$, that mostly dissolves in the aqueous solvent. This is illustrated in the following idealized reaction:

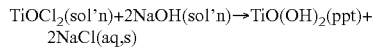

$TiOCl_2(sol'n) + 2NaOH(sol'n) \rightarrow TiO(OH)_2(ppt) + 2NaCl(aq,s)$

The titanium-containing precipitate can be readily isolated by gravity or vacuum filtration, and, optionally, the precipitate can be washed with water to remove residual metal or ammonium chloride reaction-product salt, and the precipitate can be calcined to convert it into crystalline $TiO_2$.

The physical properties of the titanium-containing precipitate can vary depending upon the final slurry pH. The precipitate can be thick and composed of relatively large particle agglomerates when the final slurry pH is in the range 5-10. Solid from such a slurry is relatively facile to collect via gravity or vacuum filtration. As the slurry pH is lowered below about 5, the slurry becomes more fluid. Below pH~3, the solids in the slurry become increasingly more difficult to filter and isolate for further processing. At a pH in the range of about 1-2 or lower, it has been found that the titanium-containing solid, comprising smaller particles, that settles on the filter membrane, compacts and transforms into a gelatinous material that becomes a barrier to liquid flow, resulting in a blocked, or "clogged", filter.

A need exists for a process for making titanium dioxide particles, and, in particular, nano-sized titanium dioxide particles, that utilizes an acidic slurry that can be easily filtered before calcination to form the final product.

SUMMARY OF THE DISCLOSURE

In a first aspect, the disclosure provides a process for preparing nanocrystalline titanium dioxide, and in particular rutile nanocrystalline titanium dioxide, comprising:
(a) precipitating a mixture comprising hydrated titanium oxide and a separable filtering agent;
(b) filtering the precipitated mixture to form a filter cake comprising the precipitated hydrated titanium oxide and a separable filtering agent,
(c) calcining the precipitated hydrated titanium oxide and separable filtering agent at a temperature of greater than about 300° C. to form a mixture comprising titanium dioxide and the separable filtering agent; and
(d) removing the separable filtering agent to recover titanium dioxide particles.

In the first aspect, the mixture comprising hydrated titanium oxide and a separable filtering agent may be prepared by reacting, in the presence of a solvent, titanium tetrachloride or titanium oxychloride with MOH wherein M is selected from the group consisting of $NH_4$, and Group 1 metals, and mixtures thereof. The Group 1 metals are listed in Group 1 of the Periodic Table of Elements, Handbook of Physics and Chemistry, $65^{th}$ Ed., 1984-85. Typically, the solvent is selected from the group consisting of water, water containing metal halides, water containing ammonium halides, neat alcohols, alcohols containing metal halides, alcohols containing ammonium halides, aldehydes, ketones, nitriles, and ethers and mixtures thereof. Alcohols are selected from the group of methanol, ethanol, n-propanol, iso-propanol, and butyl alcohol isomers and mixtures thereof.

Some typical Group 1 metals include Na, K, Li and Rb.

DETAILED DESCRIPTION OF THE DISCLOSURE

In studying the reactions of $TiOCl_2$ with bases such as MOH (M=$NH_4$, Li, Na, K, etc.), it was found that by allowing the metal or ammonium chloride salt, that is generated in the reaction, to co-precipitate with the titanium-containing precipitate at low pH values, such as a pH of less than about 3, more typically a pH of less than about 2, and still more typically a pH of about 1, a filterable solid was produced that did not convert into a gelatinous mass. While not wishing to be bound by theory, the precipitated metal or ammonium chloride salt may serve as a filtering agent that prevented small gel particles from coalescing into larger particles or into a large gelatinous mass. After filtration, the metal or ammonium chloride salt can remain in the isolated precipitate, and the salt may not have to be removed, e.g., by washing with water, before any subsequent calcining process steps. Indeed, water-washing to remove the salt may create conditions for a titanium-containing gel to form, thereby negating the reason for introducing the separable salt filtering agent.

In step (a) of the process, the mixture comprising hydrated titanium oxide and a separable filtering agent may be prepared by reacting, in the presence of a solvent, titanium tetrachloride or titanium oxychloride with MOH wherein M is selected from $NH_4$, Group 1 metals or mixtures thereof. The Group 1 metals, also known as alkali metals, are shown in Group 1 of the Periodic Table of Elements, Handbook of Physics and Chemistry, $65^{th}$ Ed., 1984-85, and mixtures thereof. Some typical Group 1 metals include Na, K, Li and Rb. The reaction can take place at any temperature between the freezing point and boiling point of the solvent system as long as the solvent provides precipitation of 50 wt. % or more of the reaction-generated $NH_4Cl$ or MCl salts. In the case of using aqueous $NH_4Cl$ saturated at room temperature, for example, at higher temperature, the solution would no longer be saturated and the solution could dissolve more of the filtering agent and this is undesirable. On the other hand, for saturated aqueous NaCl, higher temperatures could be used to react $TiOCl_2$ and NaOH because the solubility of NaCl in water changes only a little between room temperature and 100° C.

In order to achieve good filtering properties while preventing extended gel formation at pH values less than about 3, more typically less than about 2 and still more typically about 1, enough of the metal or ammonium chloride salt generated in the reaction must precipitate along with the titanium-containing solid to enable filtration. It is believed that a major portion, typically greater than about 50%, of the metal or ammonium chloride salt generated in the reaction should precipitate with the titanium-containing solid. To precipitate a major fraction of salt, the solvent must have a low capacity to dissolve the reaction-generated salt filtering agent. For an aqueous solvent, a saturated metal or ammonium chloride salt solution may be used. For example, in a reaction of $TiOCl_2$ with NaOH, the process may employ saturated sodium chloride solution. Alternately, for $TiOCl_2$ and $NH_4OH$, saturated aqueous ammonium chloride solution may serve as a starting solvent. The saturated salt starting solutions may become somewhat diluted after adding $TiOCl_2$ solutions or aqueous base solutions, such as solutions of NaOH or $NH_4OH$. However, conditions can be easily selected to keep the solvent close to its salt saturation level so that most of the metal or ammonium chloride salt produced from the reaction is forced to precipitate along with the titanium-containing solid. Water may also be used as a suitable solvent. Alcohols are also suitable solvents that would have very low metal or ammonium chloride salt solubility. Some suitable alcohols include, but are not limited to, methanol, ethanol, n-propanol, isopropanol, or any of the butyl alcohol isomers. Other solvents such as aldehydes, ketones, nitriles, and ethers, may also be suitable solvents. Mixtures of solvents can also be used.

Typically, the solvent is selected from water containing metal or ammonium halides, neat alcohols, or alcohols containing metal or ammonium halides. Some typical alcohols include ethanol, n-propanol, i-propanol, and butanols. The alcohols can also contain ammonium halide or aqueous Group 1 metal halides, or mixture thereof. The separable filtering agent is typically a salt represented by MCl wherein M is selected from $NH_4$, Group 1 metals from the Periodic Table of Elements, Handbook of Physics and Chemistry, $65^{th}$ Ed., 1984-85, and mixtures thereof.

The precipitated mixture is then filtered to form a filter cake comprising the precipitated hydrated titanium oxide and a separable filtering agent. This may be accomplished using a vacuum filtering device such as a Pyrex glass filter flask and a filter typically having about 0.2 to about 0.8 μm openings, more typically about 0.45 μm openings. The filter cake may then be dried, typically under an IR lamp and then may be powdered, prior to calcining, using, for example, a mortar.

The filtering step is improved using the process described herein. In contrast to known processes where a gel settles on the filter membrane blocking the flow of liquid from the slurry, the liquid portion of the slurry made in accordance with this disclosure can easily flow through the filter membrane leaving the solid portion behind on the filter membrane in the form of a filter cake. In one embodiment, the filter membrane can be substantially free of filter-blocking gel.

The precipitated hydrated titanium oxide and separable filtering agent may then be calcined at a temperature greater than about 300° C., more typically at a temperature greater than about 400° C., and still more typically at a temperature greater than about 425° C. The upper limit for the calcining temperature is determined by the primary and secondary particle size of the titanium dioxide particles desired. Typically, calcining takes place for a time of about 0.05 hours to about 12 hours, more typically about 1 to about 4 hours. Calcining may be conducted in a tube furnace, box furnace, or other suitable heating device.

After calcining, the metal chloride may be removed by washing with water or a solution comprising water. In the case of $NH_4Cl$, the salt is removed by sublimation by heating at temperatures greater than about 300° C. Therefore, when a tube furnace is used for the calcining step, sublimed $NH_4Cl$ may be collected at the cool ends of the tube. The metal or ammonium chloride particles, or "spacers", may also serve to lower agglomeration of the calcined titanium dioxide particles by maintaining a separation, or space, between many of the titanium dioxide particles that could otherwise be in contact and have a tendency to stick together thus making larger agglomerates.

One benefit of conducting the $TiOCl_2$ reactions at low pH is that after calcining at relatively low temperatures, ca. 300-600° C., a high fraction, greater than about 50%, of the titanium dioxide particles can have the rutile structure. In comparison, similar reactions performed at higher pH values, e.g., pH greater than 3, give a predominance of anatase in the product obtained by calcining in the same temperature range. Low pH reactions, therefore, can provide a means of producing a nanocrystalline and nanoparticulate rutile-rich product. The term "rutile-rich" means a titanium dioxide product which is greater than about 50% rutile, typically greater than about 60% rutile but a higher proportion of rutile may also be present. Thus, the titanium dioxide can be 90% rutile or even higher. The titanium dioxide particles formed have a primary particle size of about 10 nm to about 100 nm, more particularly about 15 nm to about 50 nm. The titanium dioxide primary particles are agglomerated into larger particles that can be dispersed to provide a particle size distribution (PSD) $d_{50}$ of less than about 100 nm. The titanium dioxide particles have a surface area of about 10 to about 90 $m^2/g$.

One area of increasing demand for titanium dioxide nanoparticles is in cosmetic formulations, particularly in sunscreens as a sunscreen agent. Titanium dioxide nanoparticles provide protection from the harmful ultraviolet rays of the sun (UV A and UV B radiation).

The examples which follow, and the description of illustrative and preferred embodiments of the present disclosure are not intended to limit the scope of the disclosure. Various modifications, alternative constructions and equivalents may be employed without departing from the true spirit and scope of the appended claims.

All parts and percentages are by weight unless stated otherwise.

EXAMPLES

Comparative Example 1

In this example reaction of titanium oxychloride and $NH_4OH$ in water at a pH of about 1 produced a gelatinous material that was difficult to isolate by filtration.

20.0 g (14 mL) of 50 wt. % $TiCl_4$ in water were added to about 200 mL deionized water with stirring with a Teflon coated magnetic stirring bar in a 400 mL Pyrex beaker. With continued stirring, 24 mL 1:1 $NH_4OH$ solution, made by mixing equal parts by volume of concentrated ammonium hydroxide and deionized water, were added to the titanium-chloride solution to raise the pH to about 1, as measured with multi-color strip pH paper. The resulting white slurry was stirred for about 10 minutes at ambient temperature.

In an attempt to separate the solid from the liquid part of the slurry, the white slurry was transferred to a vacuum filtering vessel having a filter with 0.45 μm openings. The slurry filtered very slowly and only a small amount of material collected on the filter after several hours. The material on the filter eventually converted into a transparent gel that essentially stopped the filtering process.

Comparative Example 2

In this example reaction of titanium oxychloride and NaOH in water at a pH of about 1 produced a gelatinous material that was difficult to isolate by filtration.

20.0 g (14 mL) of 50 wt. % $TiCl_4$ in water were added to about 200 mL deionized water with stirring with a Teflon coated magnetic stirring bar in a 400 mL Pyrex beaker. With continued stirring, about 40 mL of 14.4 wt % aqueous NaOH solution were added to the titanium-chloride solution to raise the pH to about 1, as measured with multi-color strip pH paper. The resulting white slurry was refluxed for about 4.5 hrs, then cooled to room temperature.

In an attempt to separate the solid from the liquid part of the slurry, the white slurry was transferred to a vacuum filtering vessel having a filter with 0.45 μm openings. Some white material immediately passed through the filter. The slurry filtered very slowly and only a small amount of material collected on the filter after several hours. The material on the filter eventually converted into a transparent gel that essentially stopped the filtering process.

Example 1

In this example reaction of titanium oxychloride and $NH_4OH$ in saturated aqueous ammonium chloride solution at a pH of about 1 produced a filterable material that was easily dried to a powder.

About 10.5 mL of concentrated $NH_4OH$ solution were added to 200 mL of saturated aqueous $NH_4Cl$ solution in a 400 mL beaker with stirring using a Teflon coated magnetic stirring bar. 20.0 g (14 mL) of 50 wt. % $TiCl_4$ in water were added to the $NH_4Cl/NH_4OH$ solution to give a final pH of about 1, as measured with multi-color strip pH paper. The resulting white slurry was stirred for about 1 hr at ambient temperature.

The white slurry comprising hydrated titanium oxide and the separable filtering agent was transferred to a vacuum filtering vessel having a filter with 0.45 μm openings. The slurry was filtered and there was no gel on the filter that was detected. The filter cake was dried under an IR lamp, powdered in a mortar, and calcined in a tube furnace in air by heating to 450° C. over a period of 1 hr, and holding the sample at 450° C. for 1 hr. The sublimed $NH_4Cl$ was collected at the cool ends of the tube. An X-ray powder diffraction pattern of the calcined titanium dioxide product showed the presence of the rutile form of $TiO_2$ as the major component, ~85%, and the anatase form as the minor component, ~15%.

Example 2

In this example illustrates that reaction of titanium oxychloride and NaOH in saturated aqueous sodium chloride solution at a pH of about 1 produced a filterable material that was easily dried to a powder.

20.0 g (14 mL) of 50 wt. % $TiCl_4$ in water were added to about 200 mL saturated aqueous NaCl solution with stirring with a Teflon coated magnetic stirring bar in a 400 mL Pyrex beaker. With continued stirring, about 41 mL of 14.0 wt % aqueous NaOH solution were added to the titanium-chloride solution to raise the pH to about 1, as measured with multi-color strip pH paper. The resulting white slurry was stirred for about 10 minutes at ambient temperature.

The white slurry comprising hydrated titanium oxide and the separable filtering agent was transferred to a vacuum filtering vessel having a filter with 0.45 μm openings. The slurry was filtered and there was no gel on the filter that was detected. The filter cake was dried under an IR lamp, powdered in a mortar, and calcined in a box furnace by heating to 450° C. over a period of 1 hr, and holding the sample at 450° C. for 1 hr. Some of the calcined material washed to remove NaCl by stirring with fresh portions of deionized water until the supernatant conductivity was <100 μS. The washed product was collected by suction filtration and dried in air under an IR lamp. An X-ray powder diffraction pattern of the washed product showed only the presence of the rutile and anatase forms of $TiO_2$ in roughly equal amounts.

Example 3

In this example reaction of titanium oxychloride and $NH_4OH$ in n-propanol solution at a pH of about 1 produced a filterable material that was easily dried to a powder.

20.0 g (14 mL) of 50 wt. % $TiCl_4$ in water were added to about 200 mL n-propanol with stirring with a Teflon coated magnetic stirring bar in a 400 mL Pyrex beaker. With continued stirring, enough concentrated $NH_4OH$ solution was added to achieve a pH of about 1, as measured with multi-color strip pH paper that was pre-moistened with deionized water. The resulting white slurry was stirred for about 1 hr at room temperature.

The white slurry was transferred to a vacuum filtering vessel having a Teflon filter with 0.45 μm openings. The slurry was filtered and there was no gel on the filter that was detected. The filter cake was dried under an IR lamp, powdered in a mortar, and calcined in a tube furnace in air by heating to 450° C. over a period of 1 hr, and held at 450° C. for 1 hr. The sublimed $NH_4Cl$ was collected at the cool ends of the tube. An X-ray powder diffraction pattern of the calcined titanium dioxide product showed only the presence of the rutile and anatase forms of $TiO_2$ in roughly equal amounts.

What is claimed is:

1. A process for preparing nanocrystalline titanium dioxide, comprising the following steps:
   (a) forming a mixture by combining starting materials comprising
      (i) an aqueous titanium oxychloride,
      (ii) a MOH, where M is selected from the group consisting of $NH_4$, Na, K, Li, and Rb, and mixtures thereof, and
      (iii) a solvent comprising an alcohol or an aqueous salt solution that is capable of precipitating a filtering agent and a hydrated titanium oxide in the mixture;
   wherein the mixture has a pH less than about 3 and a precipitate comprising the filtering agent having a formula MCl and a hydrated titanium oxide;
   (b) filtering the precipitate to form a filter cake;
   (c) calcining portions of the filter cake at a temperature greater than about 300° C. to form a calcined mixture comprising titanium dioxide,
   (d) removing the filtering agent from the calcined mixture, and
   (e) recovering nanocrystalline titanium dioxide.

2. The process of claim 1 wherein the solvent is selected from the group consisting of an alcohol and an aqueous salt solution.

3. The process of claim 1 wherein the pH of the mixture is less than about 2.

4. The process of claim 1 wherein the pH of the mixture is about 1.

5. The process of claim 1 wherein the nanocrystalline titanium dioxide has a primary particle size that does not exceed about 100 nm.

6. The process of claim 1 wherein step (c) and step (d) occurs simultaneously.

7. The process of claim 1 wherein the filtering agent is $NH_4Cl$.

8. The process of claim 1 further comprising in step (d) removing the filtering agent from the calcined material by washing the calcined material with water or a solution comprising water.

9. The process of claim 1 wherein the nanocrystalline titanium dioxide is predominantly rutile.

* * * * *